US009799893B2

(12) United States Patent
Campbell (10) Patent No.: US 9,799,893 B2
(45) Date of Patent: Oct. 24, 2017

(54) CATALYST SUPPORT FOR FUEL CELL (75) Inventor: Stephen A. Campbell, Maple Ridge (CA)

(73) Assignee: Daimler AG, Stuttgart (NL)

( * ) Notice: Subject to any disclaimer, the term of this patent is extended or adjusted under 35 U.S.C. 154(b) by 1936 days.

(21) Appl. No.: 12/446,118

(22) PCT Filed: Oct. 18, 2007

(86) PCT No.: PCT/US2007/081834
§ 371 (c)(1),
(2), (4) Date: Dec. 1, 2010

(87) PCT Pub. No.: WO2008/049077
PCT Pub. Date: Apr. 24, 2008

(65) Prior Publication Data
US 2011/0065014 A1 Mar. 17, 2011

Related U.S. Application Data (60) Provisional application No. 60/829,946, filed on Oct. 18, 2006.

(51) Int. Cl.
*H01M 4/92* (2006.01)
*H01M 4/90* (2006.01)
*H01M 8/1018* (2016.01)

(52) U.S. Cl.
CPC ........... *H01M 4/92* (2013.01); *H01M 4/9075* (2013.01); *H01M 4/925* (2013.01); *H01M 2008/1095* (2013.01)

(58) Field of Classification Search
CPC ..................... H01M 4/9075; H01M 4/925
See application file for complete search history.

(56) References Cited

U.S. PATENT DOCUMENTS

| 3,951,860 A | 4/1976 | Acres et al. |
| 4,454,246 A | 6/1984 | Fung |
| 5,068,161 A | 11/1991 | Keck et al. |
| 6,057,054 A | 5/2000 | Barton et al. |
| 2004/0236156 A1 | 11/2004 | Kadowaki et al. |
| 2005/0069753 A1 | 3/2005 | Swider-Lyons et al. |

(Continued)

FOREIGN PATENT DOCUMENTS

| DE | 698 04 829 T2 | 11/2002 |
| GB | 1 342 876 A | 1/1974 |

(Continued)

OTHER PUBLICATIONS

Ichimin Shirotani, et al., "Electrical Conductivity and Superconductivity of Metal Phosphides with Skutterudite-Type Structure Prepared at High Pressure", J. Phys. Chem. Solids, 1996, pp. 211-216, vol. 57, No. 2.

(Continued)

*Primary Examiner* — Ula C Ruddock
*Assistant Examiner* — Frank Chernow
(74) *Attorney, Agent, or Firm* — Crowell & Moring LLP (57) ABSTRACT

A catalytic material for a fuel cell comprising a catalyst supported on a catalyst support, wherein the catalyst support comprises a Period IV transition metal phosphide is disclosed. A membrane electrode assembly (MEA) and fuel cell stack comprising such a catalytic material are similarly disclosed.

6 Claims, 6 Drawing Sheets (56) References Cited

U.S. PATENT DOCUMENTS

| | | |
|---|---|---|
| 2005/0120827 A1 | 6/2005 | Fetcenko et al. |
| 2005/0170946 A1 | 8/2005 | Ovshinsky et al. |
| 2006/0099488 A1 | 5/2006 | Daimon et al. |
| 2007/0298293 A1 | 12/2007 | Son |

FOREIGN PATENT DOCUMENTS

| | | | | |
|---|---|---|---|---|
| GB | 1 417 544 A | | 12/1975 | |
| GB | 1 418 943 A | | 12/1975 | |
| JP | 2006-49183 A | | 2/2006 | |
| WO | WO-01/23501 | * | 4/2001 | ............. C10G 45/04 |
| WO | WO 01/23501 A1 | | 4/2001 | |

OTHER PUBLICATIONS

Ichimin Shirotani, et al., "Electrical Conductivity of Nickel Phosphides", Jpn. J. Appl. Phys., 1993, pp. 294-296, vol. 32, Suppl. 32-3.

Shaofeng Yang, et al., "New Synthesis Method for Metal Phosphide Hydrotreating Catalysts", Abstract Only, Scientific Bases for the Preparation of Heterogeneous Catalysts: Proceedings of the 9th International Symposium, Sep. 10-14, 2006, Louvain-la-Neuve, Belgium.

Shaofeng Yang, et al., "Preparation and Hydrotreating Activity of Unsupported Nickel Phosphide with High Surface Area", Journal of Catalysis, 2006, pp. 465-469, vol. 241, No. 2.

Karl A. Gingerich, et al., "Study of High Temperature Properties of Transition Metal Phosphides and Related Refractory Materials", Final Report, Report No. NYO-2541-1, Contract No. At(30-1)-2541, 1964, 22 pages, United States Atomic Energy Commission.

Xianquin Wang, et al., "Synthesis, Characterization, and Hydrotreating Activity of Several Iron Group Transition Metal Phosphides", Journal of Catalysis, 2002, pp. 321-331, vol. 208.

A. Beganskiene, et al., "Water Based Sol-Gel Synthesis of Hydroxyapatite", Materials Science, 2003, pp. 383-386, vol. 9, No. 4.

S. G. Bogdanov, et al., "Structure of Zirconium Phosphate Gels Produced by the Sol-Gel Method", J. Phys: Condens Matter, 1997, pp. 4031-4039, vol. 9.

Yuying Shu, et al., "Synthesis, Characterization, and Hydrotreating Activity of Carbon-Supported Transition Metal Phosphides", Carbon, 2005, pp. 1517-1532, vol. 43.

Heriberto Pfeiffer, et al. "Synthesis, Characterization and Thermal Stability of $Ni_3P$ Coatings on Nickel", Materials Chemistry & Physics, 2005, pp. 534-539, vol. 92.

German-language Office Action issued in counterpart German Application No. 11 2007 002 462.3 dated Jul. 25, 2017 (6 pages).

* cited by examiner

CATALYST SUPPORT FOR FUEL CELL

BACKGROUND

Technical Field

The present disclosure relates to catalyst support for electrochemical fuel cells.

Description of the Related Art

Fuel cell systems are currently being developed for use as power supplies in numerous applications, such as automobiles and stationary power plants. Fuel cell systems offer the promise of economically delivering power with environmental and other benefits. However, to be commercially viable fuel cell systems need to exhibit adequate reliability in operation, even when the fuel cells are subjected to conditions outside the preferred operating range. For a proton exchange membrane ("PEM") fuel cell to be used commercially in either transportation or stationary applications, 5,000 to 40,000 hours of operation may be required.

A fuel cell may include a PEM interposed between two electrodes; namely, a cathode and an anode. Both the anode and cathode typically include a gas diffusion layer and a catalyst layer. The anode, PEM and cathode, or membrane electrode assembly (MEA), is usually disposed between flow field plates, which allow the ingress and egress of reactant and reaction product to the catalyst layer. The MEA and flow field plates, known as a fuel cell, may be coupled in series to form a fuel cell stack.

At the anode, fuel (typically in the form of hydrogen gas) reacts at the electrocatalyst in the presence of the PEM to form hydrogen ions and electrons. At the cathode, oxidant (typically air) reacts in the presence of the PEM at the electrocatalyst to form anions. The PEM isolates the fuel stream from the oxidant stream and facilitates the migration of the hydrogen ions from the anode to the cathode, where they react with anions formed at the cathode. The electrons pass through an external circuit, creating a flow of electricity. The net reaction product is water. The anode and cathode reactions in hydrogen gas fuel cells are shown in the following Equations (1) and (2):

$$H_2 \rightarrow 2H^+ + 2e^- \quad (1)$$

$$\tfrac{1}{2}O_2 + 2H^+ + 2e^- \rightarrow H_2O \quad (2)$$

The catalyst layer is typically comprised of a catalyst, supported on a catalyst support. Fuel cell catalysts known in the art include platinum and platinum-ruthenium. Fuel cell catalyst supports known in the art include carbon black, including furnace black and acetylene black. Such catalyst supports are employed for their relatively low cost, good electronic conductivity, and their ability to be made sufficiently porous to allow the passage of reactant and reaction product to and from the reaction site. In practice, significant difficulties have been encountered with regard to consistently obtaining sufficient operational lifetimes for fuel cells due, in part, to oxidation of the catalyst support at the anode and/or cathode.

Accordingly, there remains a need in the art for improved catalyst supports for electrochemical fuel cells, particularly with regard to mitigating and/or eliminating oxidation of the catalyst support. The present disclosure fulfills this need and provides further related advantages.

BRIEF SUMMARY

Without intending to be bound by theory, it is believed that oxidation of the catalyst support erodes the catalyst support to which the catalyst particles are adhered. Such oxidation allows the catalyst particles to lose electrical contract with the catalyst support, thereby reducing the net catalytic activity and performance of the fuel cell. In the practice of this invention, it has been discovered that use of catalyst support comprising a Period IV transitional metal significantly enhances long term stability by limiting oxidation of the catalyst support.

Accordingly, in one embodiment a catalytic material is disclosed comprising a catalyst supported on a catalyst support, wherein the catalyst support comprises a Period IV transition metal phosphide. Such as Period IV transition metal phosphide includes (but is not limited to) scandium phosphide, titanium phosphide, vanadium phosphide, chromium phosphide, manganese phosphide, iron phosphide, cobalt phosphide, nickel phosphide, copper phosphide, zinc phosphide and combinations thereof.

In another embodiment, a membrane electrode assembly is disclosed comprising a proton exchange membrane disposed between an anode and a cathode, wherein at least one of the anode and cathode comprises a catalyst supported by a catalyst support, and wherein the catalyst support comprises a Period IV transition metal phosphide.

In a further embodiment, a fuel cell stack is disclosed comprising a plurality of fuel cells, at least one of the plurality of fuel cells including an anode and a cathode, a proton exchange membrane disposed between the anode and the cathode, wherein at least one of the anode and cathode comprises a catalyst supported by a catalyst support, and wherein the catalyst support comprises a Period IV transition metal phosphide.

These and other aspects of the disclosure will be evidence up reference to the following detailed description.

BRIEF DESCRIPTION OF THE SEVERAL VIEWS OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION

Unless the context requires otherwise, throughout the specification and claims which follow, the word "comprise" and variations thereof, such as "comprises" and "comprising" are to be construed in an open, inclusive sense, that is as "including but not limited to". Also, and unless the context requires otherwise, throughout the specification and claims which follow, the word "combination" and variations thereof, such as "combinations" are to be construed in an open, inclusive sense to include for example, alloys, mixtures and solid solutions.

As used herein, "Period IV transition metals" are scandium (Sc), titanium (Ti), vanadium (V), chromium (Cr), manganese (Mn), iron (Fe), cobalt (Co), nickel (Ni), copper (Cu) and zinc (Zn). Also, as used herein, a phosphide is a compound of phosphorus with a more electropositive element or group. Accordingly, Period IV transition metal phosphides include scandium phosphide (such as ScP), titanium phosphide (such as TiP), vanadium phosphide (such as VP), chromium phosphide (such as CrP), manganese phosphide (such as MnP), iron phosphide (such as FeP, $Fe_2P$, and $FeP_3$), cobalt phosphide (such as CoP, and $Co_2P_3$) nickel phosphide (such as NiP, and $Ni_2P$), copper phosphide (such as $Cu_3P$) and zinc phosphide (such as $Zn_3P_2$), as well as other stoichiometries and combinations thereof.

Figure 1A:
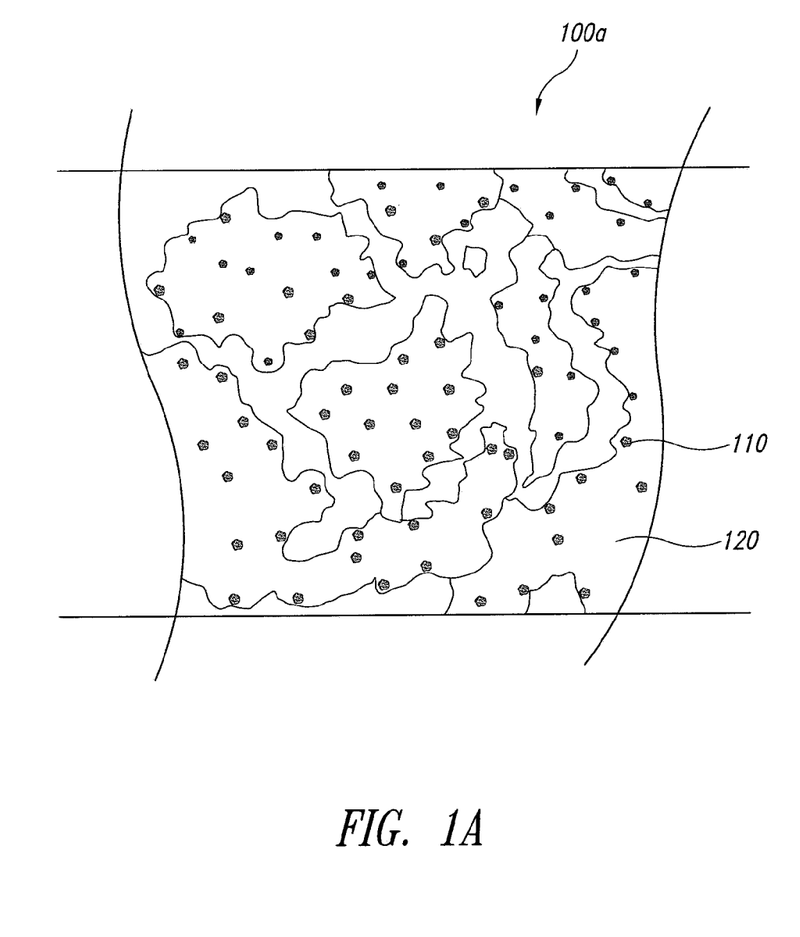
FIG. 1A is a cross-sectional schematic diagram of a catalytic material according to one illustrated embodiment.

FIG. 1A is a cross-sectional schematic diagram of catalytic material 100a, according to one illustrated embodiment. FIG. 1A shows a catalyst 110 dispersed on a catalyst support 120. Catalyst support 120 comprises a Period IV transition metal phosphide. A person or ordinary skill in the art may choose any catalyst 110 for a particular application, including noble metals such a platinum or ruthenium, non-precious metal carbides, non-precious metal nitrides, non-precious metal carbonitrides, non-precious metal chalcogenides and combinations thereof.

Figure 1B:
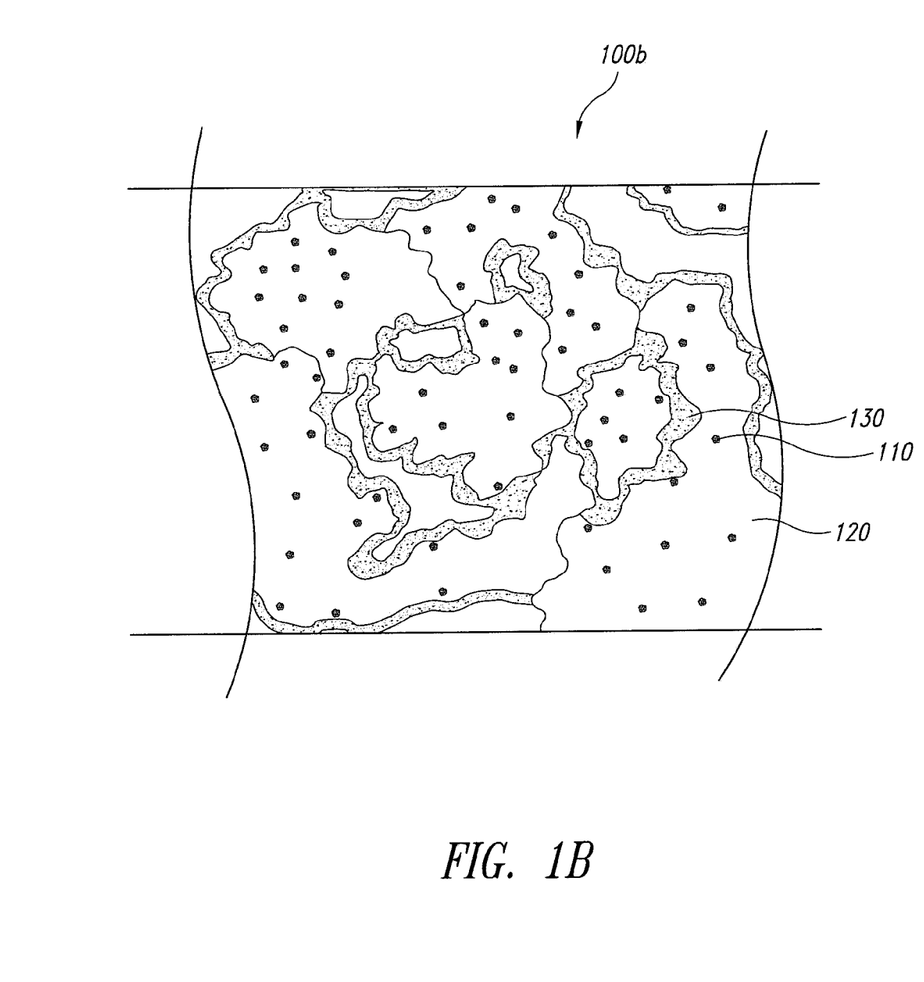
FIG. 1B is a cross-sectional schematic diagram of a catalytic material according to one illustrated embodiment.

FIG. 1B is a cross-sectional schematic diagram of catalytic material 100b, for a fuel cell, according to one illustrated embodiment. FIG. 1B shows a catalyst 110 dispersed on a catalyst support 120 in electrochemical contact with PEM 130, such that the fuel cell reactions represented by Equations (1) and (2) above can occur. Catalyst support 120 comprises a Period IV transition metal phosphide. A person or ordinary skill in the art may choose any catalyst 110 for a particular application, including noble metals such a platinum or ruthenium, non-precious metal carbides, non-precious metal nitrides, non-precious metal carbonitrides, non-precious metal chalcogenides and combinations thereof. A person of ordinary skill in the art may also choose any PEM 130 for a particular application, including perfluorinated membranes partially-fluorinated membranes and non-fluorinated membranes.

Figure 2:
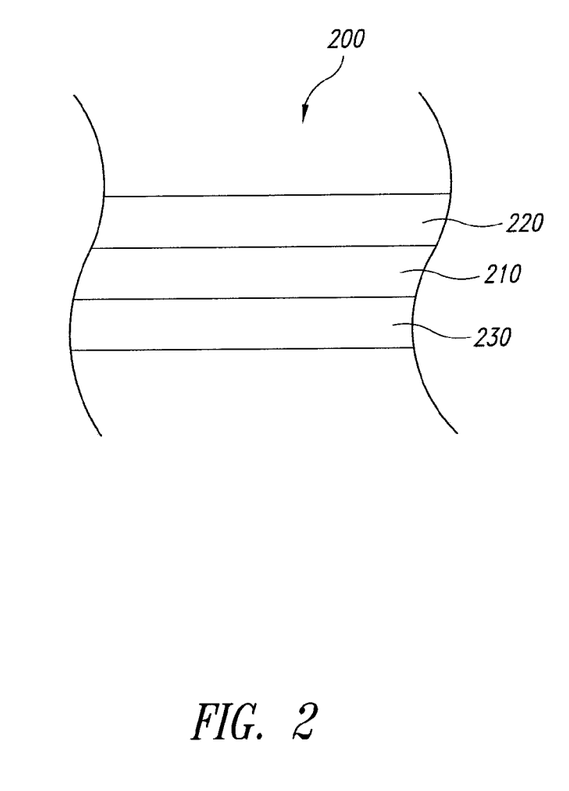
FIG. 2 is a cross-sectional schematic diagram of a membrane electrode assembly for a fuel cell according to one illustrated embodiment.

FIG. 2 is a cross-sectional diagram of a membrane electrode assembly for a fuel cell 200 according to one illustrated embodiment. FIG. 2 shows PEM 210 disposed between anode 220 and cathode 230. Anode 220 includes anode catalyst (not shown) supported on anode catalyst support (not shown). Cathode 230 includes cathode catalyst (not shown) supported on cathode catalyst support (not shown). Anode and cathode catalysts may be as described above, may be of the same or differing compositions and may be of the same or differing local or global concentrations. Likewise, anode and cathode catalyst supports may be as described above, and may be of the same or differing compositions. Anode 220 and cathode 230 may include a gas diffusion layer ("GDL") (not shown) upon which anode and cathode catalysts, supported on anode catalyst support, may be deposited. Anode or cathode catalysts, supported on anode and cathode catalyst supports may be also deposited directly onto PEM 210. Where anode or cathode catalysts, supported on anode and cathode catalyst supports are be deposited directly onto PEM 210, a GDL may also be employed. A person of ordinary skill in the art may also include additional layers of material for a particular application. For example, reactant poison scrubbing catalyst layers may be included such as, for example, where fuel includes electrocatalyst poisoning species such as carbon monoxide.

Figure 3:
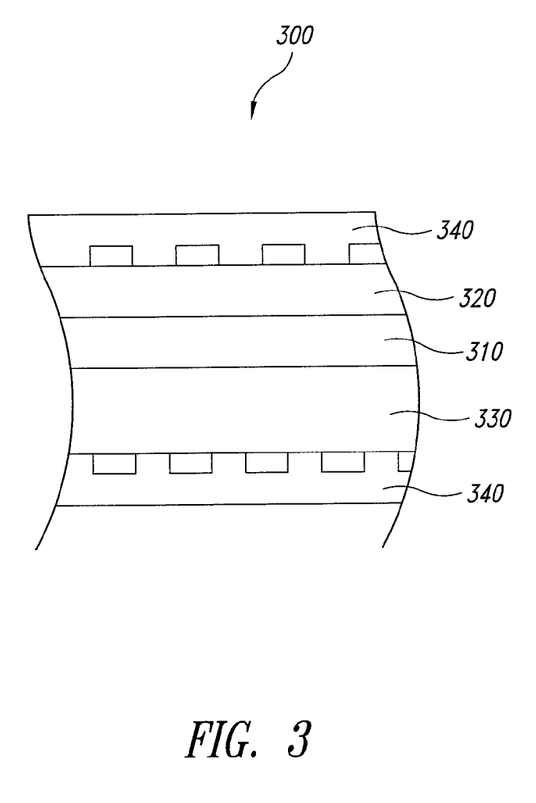
FIG. 3 is a cross sectional schematic diagram of a fuel cell stack according to one illustrated embodiment.

FIG. 3 is a cross section of a fuel cell stack according to one illustrated embodiment. FIG. 3 shows PEM 310 disposed between anode 320 and cathode 330, further disposed between flow field plates 340 for providing reactant and reaction product to and from the reaction sites. Flow field plates 340 also provide structural support to the fuel cell. As is known in the art, flow field plates 340 may be comprised of a suitable electrically conductive material including metallic or graphitic materials. A person of ordinary skill in the art may choose a material for the flow field plates 340 for a particular application.

In general terms, Period IV transition metal phosphides may be prepared by one of ordinary skill in the art by know techniques by, for example, combining $(NH_4)_2PO_4$ with the desired Period IV transition metal(s). More specifically, and in the case of nickel phosphide (such as $Ni_2P$) as the Period IV transition metal phosphide, $Ni_2P$ may be prepared by first dissolving 5 g of $(NH_4)_2PO_4$ in 300 ml of water in a stirring beaker and dissolving 11 g of $Ni(NO_3)_2.6H_2O$ in 100 ml of water. The $Ni(NO_3)_2.6H_2O$ solution is added to the $(NH_4)_2PO_4$ drop-wise via an addition funnel. $HNO_3$ is then added to yield a clear green solution that is reduced by heating and dried to yield green crystals of $NiHPO_4$. The $NiHPO_4$ crystals are then ground into a fine powder in an agate mortar and pestle, placed in a porcelain combustion boat in a quartz tube furnace, purged with Argon gas for one hour, heated at 1 K per minute to 850° K in a 50:50 $Ar:H_2$ gas mixture and held at 850 K for 4 hours before cooling under Argon gas to ambient temperature to yield $Ni_2P$. To eliminate the chance of combustion of the sample, upon opening the furnace, a small amount of air is first allowed into the furnace tube to passivate the surface of the sample.

Transition metal phosphides may be made to have high surface area by reducing high surface area transition metal phosphates prepared using the sol-gel method of fabrication well known to one skilled in this field. For example, transition metal phosphates may be made to have high surface area through the sol-gel method of fabrication as described by Bogdanov et al. (*Structure of zirconium phosphate gels produced by the sol-gel method*, J. Phys.: Condens. Matter 9, 4031-4036, 1997). Reduction of the high surface area transition metal phosphates to high surface area transition metal phosphides may be conducted as described by Shu (*Synthesis, characterization, and hydrotreating activity of carbon-supported transition metal phosphides*, Carbon 43, 1517-1532, 2005).

EXAMPLES

Example 1

Preparation of Catalyst Support

A transition metal phosphide catalyst support, nickel phosphide ($Ni_2P$), was prepared by the following method. First, 2.000 g of $Ni(NO_3)_2.6H_2O$ was dissolved in 7.434 g of $H_2O$ to form a clear green solution, and 0.908 g $(NH_4)_2HPO_4$ was added to the solution to form a precipitate. Concentrated $HNO_3$ was then added drop-wise until the solution was again clear green. Next, 3.964 g of sodium dodecyl sulphate was added, which was stirred with gentle heating until it had dissolved to form a thick viscous green solution. The solution was then left in a 50° C. water bath until it formed a dry green soap structure. After drying, the soap was calcinated by heating at 5° C. per minute to 120° C. and held for 180 minutes, then heated at 5° C. per minute to 500° C. and held for 360 minutes, then cooled to ambient temperature leaving a brown porous structure which was ground into a fine powder. The product was then purged under Argon for 60 minutes and reduced under 20% $H_2$ gas, heating at 1° C. per minute to 577° C., where it was held for 240 minutes and then cooled to ambient temperature, yielding Sample No. 1-1.

By this method the following catalyst supports were prepared, but with different Period IV transitional metals and/or by utilizing different ratios of nitrate to sodium docecyl sulphate in the preparation thereof.

| Sample No. | Catalyst Support | Nitrate:SDS Ratio |
| --- | --- | --- |
| 1-1 | $Ni_2P$ | 1:2 |
| 1-2 | $Ni_2P$ | 1:1.5 |
| 1-3 | $Ni_2P$ | 1:1 |
| 1-4 | $Co_2P$ | 1:1 |
| 1-5 | CoNiP | 1:2 |

Example 2

Alternative Preparation of Catalyst Support

A transition metal phosphide catalyst support, nickel phosphide ($Ni_2P$), was prepared by the following alternate method. First, 1.1584 g of octadecylamine was dissolved in a solution of 150 ml propan-1-ol and 100 ml $H_2O$ by heating on a hotplate, with stirring, to form a clear colourless solution. In the solution was dissolved 2.500 g of $Ni(NO_3)_2.6H_2O$ to form a clear pale green solution. Next, 1.136 g of $(NH_4)_2HPO_4$ was added to the solution to form an opaque pale green solution with a precipitate. Concentrated $HNO_3$ was added drop-wise until the solution turned a clear pale green. The solution was then evaporated to a volume of 150 ml. The solution was then dried slowly in a 50° C. water bath until it formed a dry green soap structure. The soap structure was calcinated by heating at 5° C. per minute to 120° C., where it was held for 180 minutes, then heated at 5° C. per minute to 500° C., where it was held for 360 min, after which it was cooled to ambient temperature leaving a brown porous structure which was ground into a fine powder. The product was then purged under Argon for 60 minutes and reduced under 20% $H_2$ gas by heating at 1° C. per minute to 577° C., where it was held for 240 min and then cooled to ambient temperature.

Example 3

Surface Area of Catalyst Support

The BET theory is a well-known rule for the physical adsorption of gas molecules on a solid surface, and is widely used for the calculation of surface areas of solids. The surface area of the catalyst supports of Sample Nos. 1-1 through 1-5 of Example 1 were evaluated and showed the following BET surface areas.

| Sample No. | BET ($m^2/g$) |
| --- | --- |
| 1-1 | 1.9972 |
| 1-2 | 1.2474 |
| 1-3 | 0.9876 |
| 1-4 | 3.9062 |
| 1-5 | 4.7175 |

Example 4

Preparation of Representative Catalytic Material

A representative catalyst material (i.e., 20% Pt catalyst on $Ni_2P$ catalyst support) was prepared by adding catalyst particles (Pt) onto the surface of the $Ni_2P$ catalyst support of Sample No. 1-1 of Example 1 by the method disclosed in Example 5 of U.S. Pat. No. 5,068,161 (incorporated by reference herein), but without the addition of nickel.

More specifically, a Pt alloy catalyst was prepared at 20 wt % Pt loading as follows: 37.0 g of the catalyst support of Sample No. 1-1 of Example 1 was added to 2,000 $cm^3$ demineralised water and stirred for 15 minutes to produce a homogeneous slurry. 34.45 g sodium bicarbonate was added to the slurry and stirred for 5 minutes. The slurry was raised to 100° C., and maintained at the boil for 30 minutes. A solution of 10.0 g platinum as chloroplatinic acid, in 100 $cm^3$ demineralised water, was added to the slurry over 5 minutes. The slurry was boiled for two hours. 7.8 $cm^3$ of formaldehyde solution, diluted to 75 $cm^3$ was added over ten minutes. The slurry was boiled for a further 60 minutes and then filtered to remove the supernatent liquid and washed with demineralised water to remove the soluble chloride species. The chloride free filter cake was vacuum dried at 80° C. until the moisture content was less than 2%. The material was then heated to a temperature of 930° C. in a flowing nitrogen atmosphere and maintained at this temperature for 60 minutes to form the catalytic material.

Example 5

Activity of Representative Catalytic Materials

Figure 4:
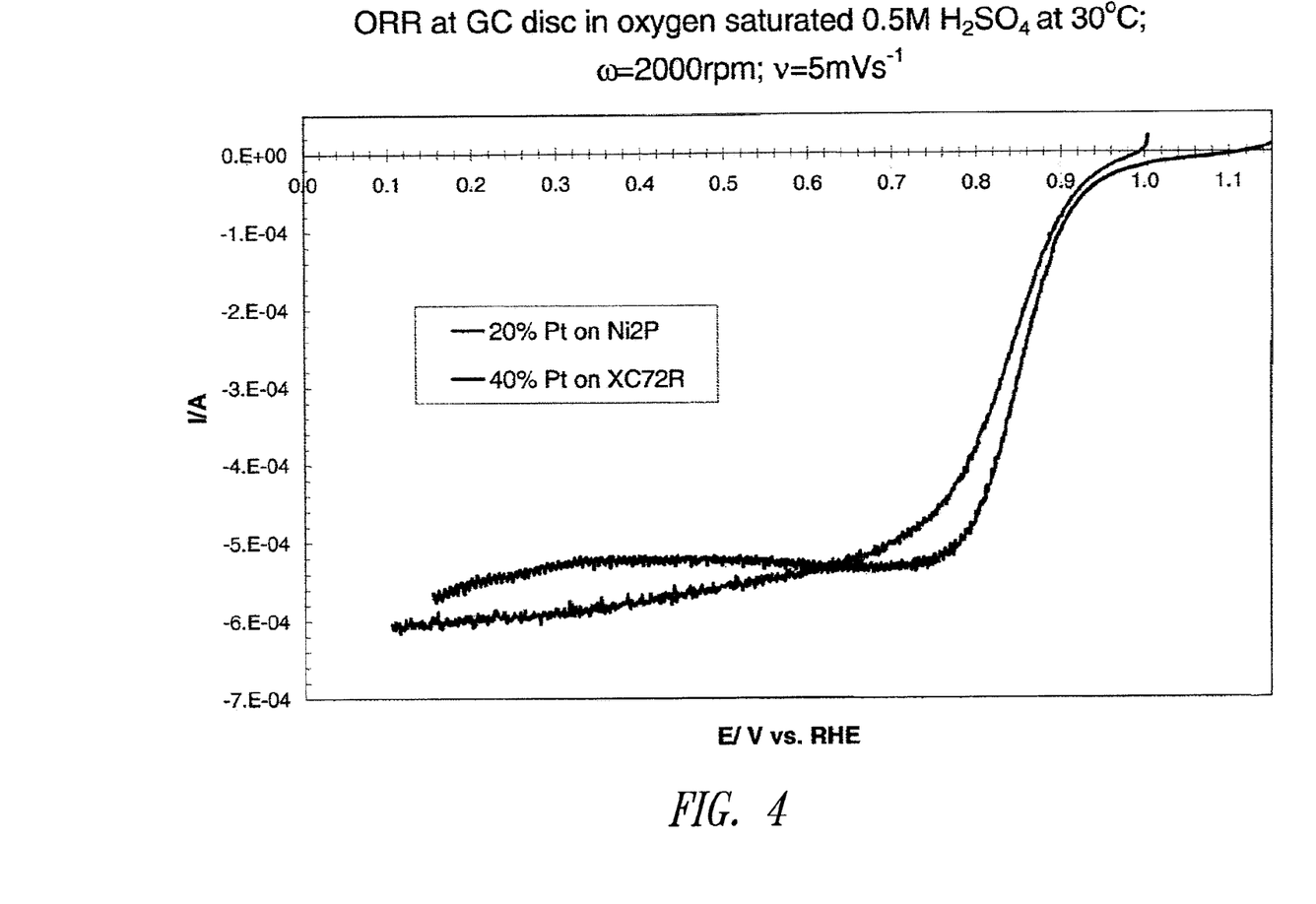
FIG. 4 is a graph of current versus electrode potential.

FIG. 4 is a plot of current versus potential for two samples; namely, (1) the catalytic material having 20% Pt catalyst on nickel phosphide ($Ni_2P$) catalyst support prepared according to Example 4, and (2) a 40% Pt on Vulcan® XC72R carbon black catalyst support commercially available from Johnson Matthey Inc. Both samples were tested on a rotating disc electrode, rotating at 2000 rpm, at a temperature of 30° C. where the potential was swept at 5 mV per second in oxygen saturated 0.5 M sulfuric acid. As can be seen in FIG. 4, the Pt catalyst on nickel phosphide ($Ni_2P$) catalyst support is catalytically active.

Figure 5:
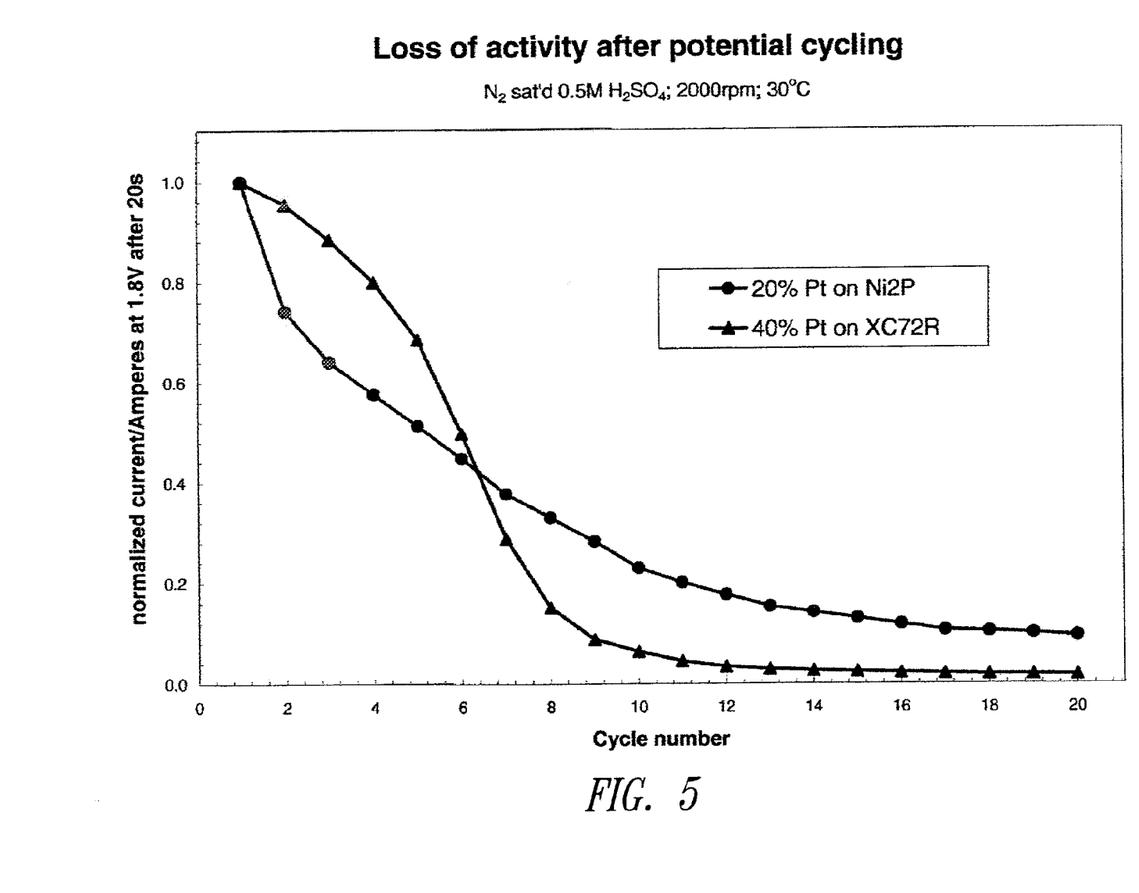
FIG. 5 is a graph of catalyst activity.

FIG. 5 is a plot of normalized current at 1.8 V after 20 seconds versus cycle number for two samples; namely, (1) the catalytic material having 20% Pt catalyst on nickel phosphide ($Ni_2P$) catalyst support prepared according to Example 4, and (2) a 40% Pt on Vulcan® XC72R carbon black catalyst support, commercially available from supplied by Johnson Matthey Inc. Both samples were tested on a rotating disc electrode, rotating at 2000 rpm, at a temperature of 30° C. in $N_2$ saturated 0.5 M sulfuric acid where they were subjected to a potential cycles between 0.6 V for 60 seconds followed by 1.8 V for 20 seconds for a total time of 1600 seconds. As can be seen in FIG. 5, the Pt catalyst on nickel phosphide ($Ni_2P$) catalyst support has better long term stability as compared to the Pt on Vulcan® XC72R carbon black catalyst support.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to MEAs, not necessarily the exemplary PEM MEAs generally described above. Also, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A membrane electrode assembly for a fuel cell, comprising a proton exchange membrane disposed between an anode and a cathode, wherein at least one of the anode and cathode comprises a catalyst supported by a catalyst support wherein the catalyst support consists of a Period IV transition metal phosphide selected from the group consisting of ScP, TiP, VP, CrP, MnP, $Fe_2P$, $FeP_3$, $Cu_3P$, $Zn_3P_2$, $Ni_2P$, $Co_2P$, CoNiP, and combinations thereof.

2. The membrane electrode assembly of claim 1 wherein the Period IV transition metal consists of $Co_2P$.

3. The membrane electrode assembly of claim 1, wherein the catalyst is comprised of a noble metal.

4. The membrane electrode assembly of claim 1 wherein the catalyst is selected from the group consisting of non-precious metal carbides, nonprecious metal nitrides, non-precious metal carbonitrides, non-precious metal chalcogenides and combinations thereof.

5. A fuel cell stack comprising a plurality of fuel cells, at least one of the plurality of fuel cells comprising an anode and a cathode, a proton exchange membrane disposed between the anode and the cathode wherein at least one of the anode and cathode comprises a catalyst supported by a catalyst support wherein the catalyst support consists of a Period IV transition metal phosphide selected from the group consisting of ScP, TiP, VP, CrP, MnP, $Fe_2P$, $FeP_3$, $Cu_3P$, $Zn_3P_2$, $Ni_2P$, $Co_2P$, CoNiP, and combinations thereof.

6. The fuel cell stack of claim 5 wherein the Period IV transition metal consists of $Co_2P$.

* * * * *